(12) United States Patent
Huang

(10) Patent No.: US 12,135,784 B2
(45) Date of Patent: Nov. 5, 2024

(54) PRIVACY-PROTECTION-BASED DATA PROCESSING MODEL ACQUISITION METHOD AND APPARATUS, TERMINAL DEVICE AND STORAGE MEDIUM

(71) Applicant: ENNEW DIGITAL TECHNOLOGY CO., LTD, Beijing (CN)

(72) Inventor: Xin Huang, Beijing (CN)

(73) Assignee: ENNEW DIGITAL TECHNOLOGY CO., LTD, Beijing (CN)

( * ) Notice: Subject to any disclaimer, the term of this patent is extended or adjusted under 35 U.S.C. 154(b) by 204 days.

(21) Appl. No.: 17/711,048

(22) Filed: Apr. 1, 2022

(65) Prior Publication Data

US 2022/0229904 A1  Jul. 21, 2022

Related U.S. Application Data

(63) Continuation of application No. PCT/CN2021/101138, filed on Jun. 21, 2021.

(30) Foreign Application Priority Data

Aug. 5, 2020  (CN) .......................... 202010778938.1

(51) Int. Cl.
*G06F 21/55* (2013.01)
*G06F 21/60* (2013.01)
*G16Y 40/50* (2020.01)

(52) U.S. Cl.
CPC ............ *G06F 21/556* (2013.01); *G06F 21/60* (2013.01); *G16Y 40/50* (2020.01); *G06F 2221/034* (2013.01)

(58) Field of Classification Search
CPC .. G06F 21/556; G06F 21/60; G06F 2221/034; G16Y 40/50
See application file for complete search history.

(56) References Cited

U.S. PATENT DOCUMENTS

| 11,036,857 | B2 * | 6/2021 | Tran ....................... G06N 3/045 |
| 2014/0137260 | A1 * | 5/2014 | Wang .................. G06F 21/6254 |
| | | | 726/26 |

(Continued)

FOREIGN PATENT DOCUMENTS

| CN | 110263870 A | 9/2019 |
| CN | 111291190 A | 6/2020 |

OTHER PUBLICATIONS

International Search Report of PCT Patent Application No. PCT/CN2021/101138 issued on Sep. 26, 2021.

*Primary Examiner* — Saleh Najjar
*Assistant Examiner* — Devin E Almeida

(57) ABSTRACT

Disclosed are a privacy-protection-based data processing model acquisition method and apparatus, a terminal device and a storage medium. The method includes: acquiring sensor data of a plurality of sensors of a preset Internet of Things device; training an initial data model corresponding to each of the sensors through the sensor data corresponding to the sensor to obtain an intermediate data model corresponding to each of the sensors, and integrating the intermediate data models corresponding to the sensors to form an integrated data model; processing new data through the integrated data model and random noise to acquire a label category corresponding to the new data; and training the integrated data model according to the new data and the label category of the new data to acquire a data model. The method solved the technical problem of poor privacy protection of Internet of Things data.

8 Claims, 4 Drawing Sheets

(56) References Cited

U.S. PATENT DOCUMENTS

| | | | |
|---|---|---|---|
| 2016/0283735 A1* | 9/2016 | Wang | G06F 21/6254 |
| 2020/0162516 A1* | 5/2020 | Israel | G06F 21/566 |
| 2021/0287141 A1* | 9/2021 | Molloy | G06F 18/22 |
| 2021/0342453 A1* | 11/2021 | Leino | G06F 21/60 |
| 2022/0027794 A1* | 1/2022 | Sawarkar | G06N 20/10 |

* cited by examiner

PRIVACY-PROTECTION-BASED DATA PROCESSING MODEL ACQUISITION METHOD AND APPARATUS, TERMINAL DEVICE AND STORAGE MEDIUM

CROSS REFERENCE TO RELATED APPLICATIONS

The present application is a Continuation Application of PCT Application No. PCT/CN2021/101138 filed on Jun. 21, 2021, which claims the benefit of Chinese Patent Application No. 202010778938.1 filed on Aug. 5, 2020. All the above are hereby incorporated by reference in their entirety.

TECHNICAL FIELD

The present invention relates to the field of Internet of Things technologies, and in particular, to a privacy-protection-based data processing model acquisition method and apparatus, a terminal device and a storage medium.

BACKGROUND

At present, the Internet of Things has become an important part of the Internet. The number of Internet of Things devices in the world keeps growing at a high speed. In the future Internet of Things, as any individual, group, community, organization, object, product, data, service, process and activity may be interconnected through the Internet of Things, personal data privacy and business secrets in the Internet of Things may become important shortcomings restricting the development of the Internet of Things. At present, research on and solutions to Internet of Things security and privacy technologies are not good guarantees, causing a growing number of concerns about security risks in the Internet of Things. Traditional centralized deep learning requires users to submit data to a data center, which is then uniformly trained by cloud servers. However, such data is likely to be misused by model trainers to infer more privacy information about users.

SUMMARY

In view of the above, embodiments of the present invention provide a privacy-protection-based data processing model acquisition method and apparatus, a terminal device and a storage medium, intended to solve the technical problem of poor privacy protection of Internet of Things data.

In a first aspect of the embodiments of the present invention, a privacy-protection-based data processing model acquisition method is provided, including:
  acquiring sensor data of a plurality of sensors of a preset Internet of Things device;
  training an initial data model corresponding to each of the sensors through the sensor data corresponding to the sensor to obtain an intermediate data model corresponding to each of the sensors, and integrating the intermediate data models corresponding to the sensors to form an integrated data model;
  processing new data through the integrated data model and random noise to acquire a label category corresponding to the new data; and
  training the integrated data model according to the new data and the label category of the new data to acquire a data model.

In a second aspect of the embodiments of the present invention, a privacy-protection-based data processing model acquisition apparatus is provided, including:
  a data acquisition module configured to acquire sensor data of a plurality of sensors of a preset Internet of Things device;
  a data integration module configured to train an initial data model corresponding to each of the sensors through the sensor data corresponding to the sensor to obtain an intermediate data model corresponding to each of the sensors, and integrate the intermediate data model corresponding to each of the sensors to form an integrated data model;
  a noise addition module configured to process new data through the integrated data model and random noise to acquire a label category corresponding to the new data; and
  a data training module configured to train the integrated data model according to the new data and the label category of the new data to acquire a data model.

In a third aspect of the embodiments of the present invention, terminal device is provided, including a memory, a processor and a computer program stored in the memory and runnable on the processor, wherein the processor, when executing the computer program, performs steps of the privacy-protection-based data processing model acquisition method.

In a fourth aspect of the embodiments of the present invention, a computer-readable storage medium storing a computer program is provided, wherein, when the computer program is executed by a computer, steps of the privacy-protection-based data processing model acquisition method are performed.

The privacy-protection-based data processing model acquisition method according to the embodiments of the present invention has at least the following beneficial effects. In the embodiments of the present invention, firstly, sensor data is acquired, an initial model is trained using the sensor data, and corresponding intermediate data models are obtained and integrated to form an integrated data model; secondly, new data is processed through the integrated data model and random noise to acquire a label category corresponding to the new data; finally, the integrated data model is trained by using the new data and the corresponding label category, to acquire a data model, so that a plurality of participants may construct a machine learning model without sharing data. In the present invention, a plurality of models is constructed on a plurality of pieces of sensor data, all the models are integrated, and noise perturbations are added, to finally obtain a comprehensive result, so as to achieve better performance than a single sensor model. Noise is introduced into the model, which leads to uncertainty to some extent, so as to fully cover contributions of any individual user and any Internet of Things individual and protect privacy of participants, thereby solving the technical problem of poor data privacy protection of Internet of Things.

BRIEF DESCRIPTION OF THE DRAWINGS

In order to more clearly illustrate the technical solutions in the embodiments of the present invention, the accompanying drawings used in the description of the embodiments or the prior art will be briefly introduced below. It is apparent that, the accompanying drawings in the following description are only some embodiments of the present invention, and other drawings can be obtained by those of ordinary skill in the art from the provided drawings without creative efforts.

DETAILED DESCRIPTION

In the following description, for the purpose of illustration instead of limitation, specific details such as a particular system structure and a technology are provided to make the embodiments of the present invention understood thoroughly. However, it should be understood by those skilled in the art that the present invention can also be implemented in other embodiments without the specific details. In other cases, detailed descriptions of well-known systems, apparatuses, circuits and methods are omitted, so that the present invention is described without being impeded by unnecessary details. All other embodiments obtained by those of ordinary skill in the art based on the embodiments of the present invention described fall within the protection scope of the present invention. Unless otherwise specified, the technical means used in the embodiments are conventional means known to those skilled in the art.

It is to be understood that, when used in the specification and the appended claims, the term "include/comprise" specifies the presence of the described features, integers, steps, operations, elements and/or components, but may not exclude the presence or addition of one or more of other features, integers, steps, operations, elements, components and/or combinations thereof.

It is also to be understood that, the terms used in the specification of the present application are intended only to describe specific embodiments and are not intended to limit the present application. As used in the specification of the present application and the appended claims, the singular forms of "a/an", "one", and "the" are intended to include plural forms, unless otherwise clearly specified by the context.

It is to be further understood that, the term "and/or" used in the specification of the present application and the appended claims refers to any and all possible combinations of one or more of relevant listed items and includes these combinations.

As used in the specification of the present application and the appended claims, the term "if" may be interpreted as "when", or "once", or "in response to" or "in response to detection of" depending on the context. Similarly, depending on the context, the phrase "if it is determined that" or "if [a described condition or event] is detected" may be interpreted as "once it is determined that", or "in response to a determination", or "once [a described condition or event] is detected", or "in response to a case where [a described condition or event] is detected".

First Embodiment

Figure 1:
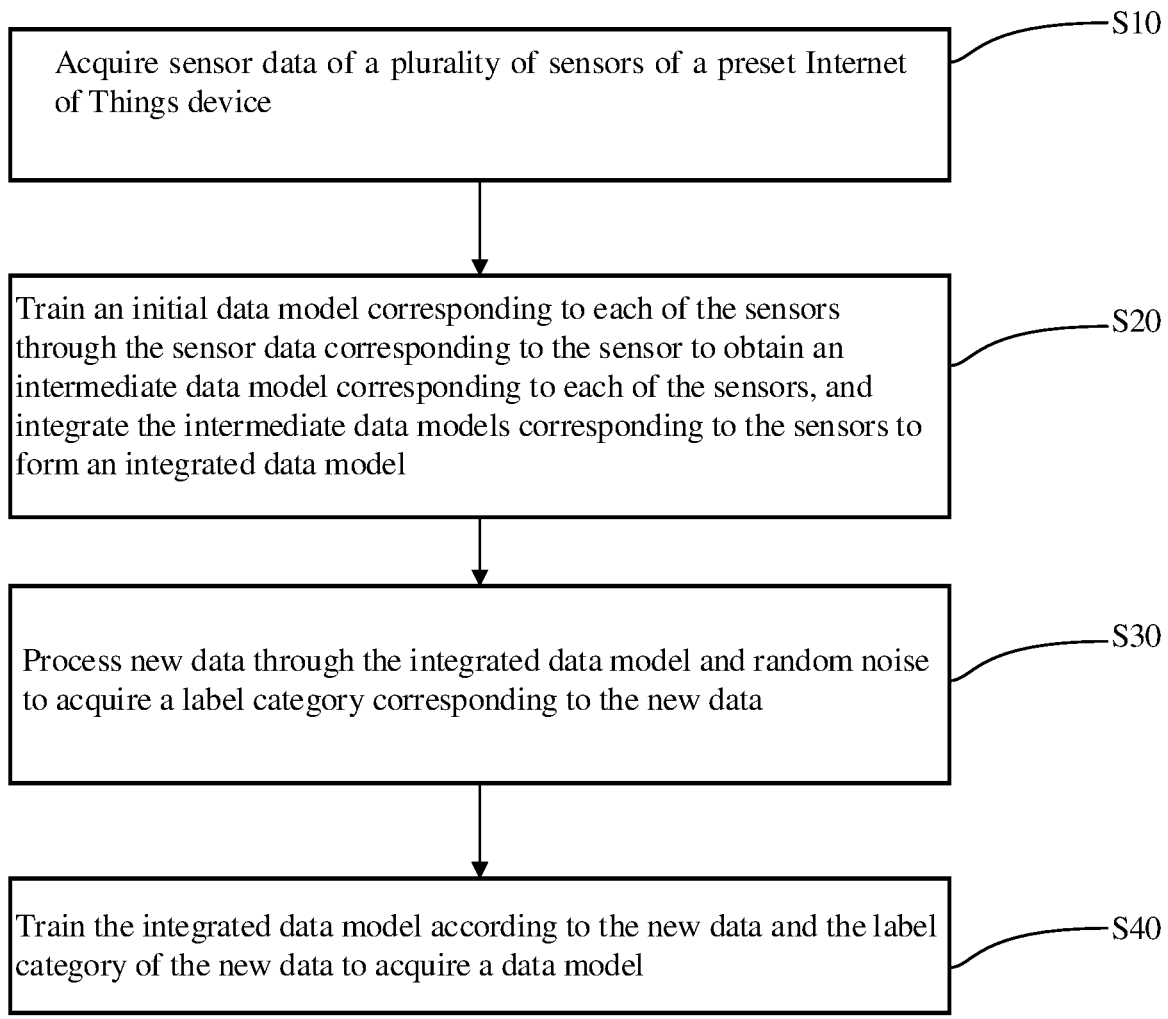
FIG. 1 is a schematic implementation flowchart of a privacy-protection-based data processing model acquisition method according to an embodiment of the present invention.

FIG. 1 is a schematic implementation flowchart of a privacy-protection-based data processing model acquisition method according to an embodiment of the present invention.

As shown in FIG. 1, the data processing model acquisition method includes the following steps.

In step S10, sensor data of a plurality of sensors of a preset Internet of Things device is acquired.

In this embodiment, the plurality of sensors of the preset Internet of Things device is sensors of a same type. The preset Internet of Things device may be a gas turbine, an ammeter, a boiler, or other devices. The sensors include temperature sensors, smoke sensors, heart rate sensors, distance sensors, photosensitive sensors, acoustic sensors, gas sensors, chemical sensors, pressure sensitive sensors, fluid sensors or other types of sensors.

In this embodiment, the sensor data is from Internet of Things devices of a same type and a same model, such as gas turbines, ammeters, boilers or other devices of a same model. In the acquisition of the sensor data, due to a sensor failure, a voltage, a motor failure or other unpredictable reasons, not every sensor can collect complete data. Where selections are possible, a plurality of pieces of relatively complete data is preferred.

In step S20, an initial data model corresponding to each of the sensors is trained through the sensor data corresponding to the sensor to obtain an intermediate data model corresponding to each of the sensors, and the intermediate data models corresponding to the sensors are integrated to form an integrated data model.

In this embodiment, the plurality of sensors may adopt same initial data models; or the plurality of sensors adopts the initial data models of a same type and different hyperparameters; or the initial data models of at least two of the plurality of sensors are different.

In this embodiment, a plurality of models is constructed on a plurality of pieces of sensor data, so that a plurality of participants can construct a machine learning model without sharing data, so as to achieve better performance than a single sensor model.

In this embodiment, the initial data model includes a neural network model, a support vector machine, a logistic regression model, a decision tree model or other data models.

In step S30, new data is processed through the integrated data model and random noise to acquire a label category corresponding to the new data.

In this embodiment, the new data is processed through random noise, which leads to uncertainty to some extent, so as to fully cover contributions of any individual user and any Internet of Things individual and protect privacy of participants.

In step S40, the integrated data model is trained according to the new data and the label category of the new data to acquire a data model.

In this embodiment, the integrated data model is trained according to the new data and the label category of the new data, which improves performance of the model while ensuring data security.

Figure 2:
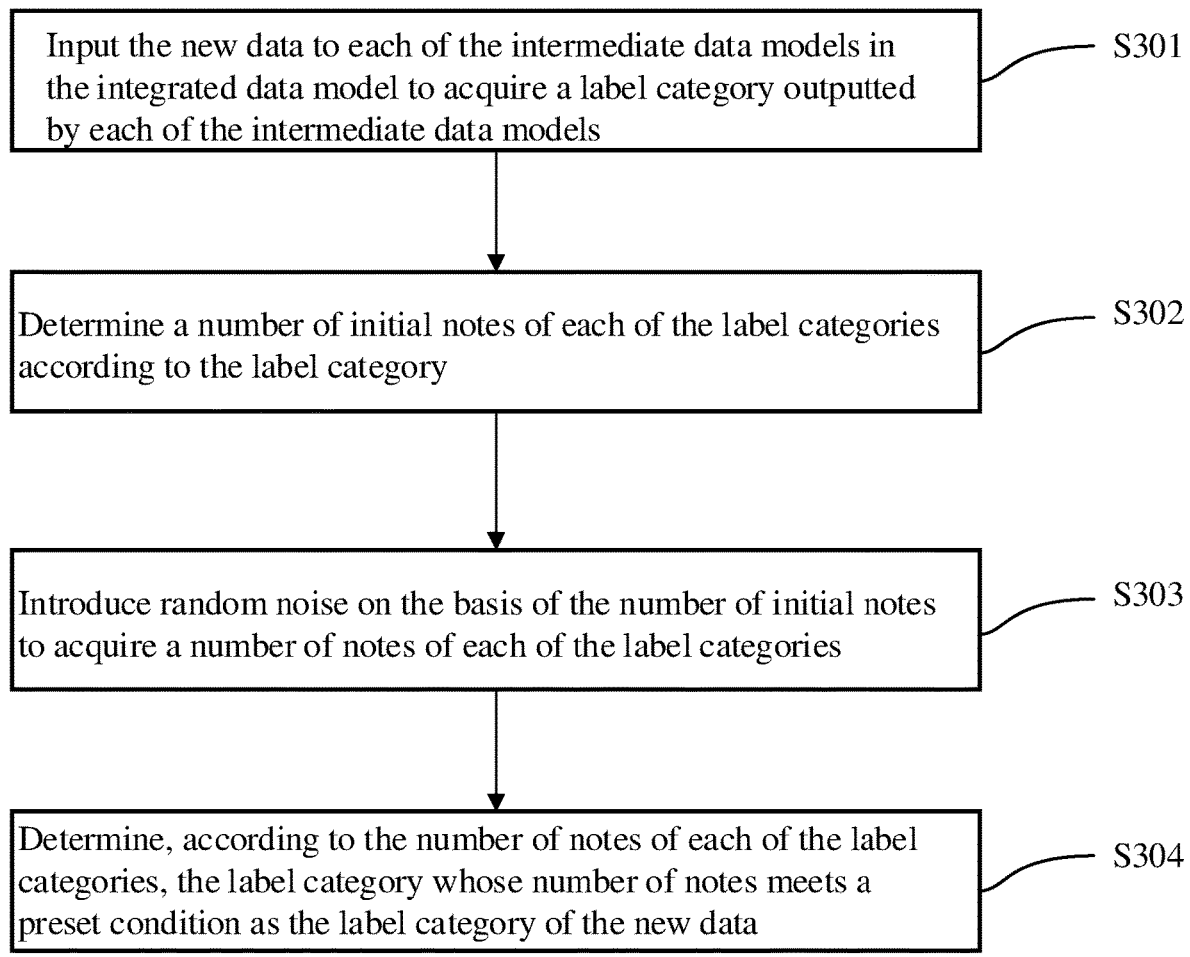
FIG. 2 is a schematic implementation flowchart of processing new data through the integrated data model and random noise to acquire a label category corresponding to the new data according to an embodiment of the present invention.

FIG. 2 is a schematic implementation flowchart of processing new data through the integrated data model and random noise to acquire a label category corresponding to the new data according to an embodiment of the present invention.

In this embodiment, in order to acquire the label category corresponding to the new data, step S30 specifically includes the following four aspects.

In step S301, the new data is inputted to each of the intermediate data models in the integrated data model to acquire a label category outputted by each of the intermediate data models.

In this embodiment, the new data does not belong to the sensor data and is generally insensitive data, such as public data sets or other relatively insensitive data.

In step S302, a number of initial notes of each of the label categories is determined according to the label category.

In step S303, random noise on the basis of the number of initial notes is introduced to acquire a number of notes of each of the label categories.

In this embodiment, the random noise includes Laplacian noise, the Laplacian noise is Lap($1/\varepsilon$), $\varepsilon$ denotes privacy costs, and a density function thereof is $$f(x, b) = \frac{1}{2b}\exp\left(-\frac{|x|}{b}\right),$$

where x denotes the new data, and $b=1/\varepsilon$.

Preferably, a maximum number of notes of the label category is:

$$f(x) = \underset{j}{\mathrm{argmax}}\{n_j(\vec{x}) + Lap(1/\varepsilon)\},$$

where x denotes the new data;
j denotes the label category; and
$n_j(\vec{x})$ denotes the number of initial notes of the label category j to which the new data x belongs.

For example, there are 10 sensor data sets, each data set trains a model, and output labels of models 1-10 for input x are (2,3,2,1,2,3,2,4,1,2). A label category is 1-5, and voting results of the 10 models for the label categories (1,2,3,4,5) are $n_j(\vec{x})$=(2,5,2,1,0).

If Laplacian noise $\varepsilon$=0.1 is added on the basis of the voting result (2,5,2,1,0), the voting result changes from (2,5,2,1,0) into (2.20,4.89,1.82,1.07,0.05), and after noise perturbations are added, the label category of the input x is still 2 (the label 2 corresponds to a maximum number of votes 4.89).

In step S304, according to the number of notes of each of the label categories, the label category whose number of notes meets a preset condition is determined as the label category of the new data.

Figure 3:
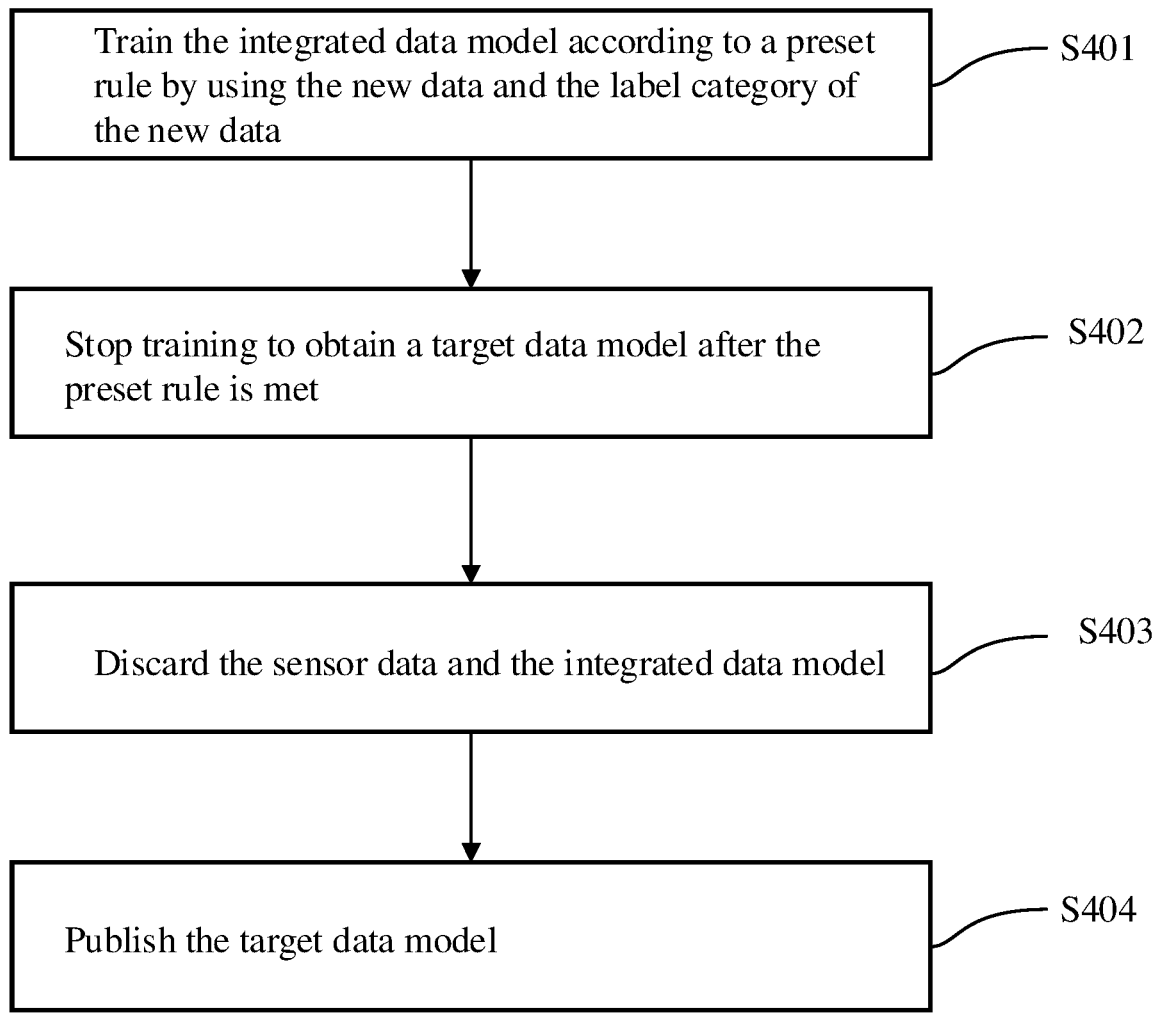
FIG. 3 is a schematic implementation flowchart of training an integrated data model according to the new data and the label category of the new data to acquire a data model according to an embodiment of the present invention.

FIG. 3 is a schematic implementation flowchart of training an integrated data model according to the new data and the label category of the new data to acquire a data model according to an embodiment of the present invention.

As shown in FIG. 3, step S40 specifically includes four aspects.

In step S401, the integrated data model is trained according to a preset rule by using the new data and the label category of the new data.

In this embodiment, the preset rule includes model precision or a number of cycles.

In step S402, training is stopped to obtain a target data model after the preset rule is met.

In step S403, the sensor data and the integrated data model are discarded.

In step S404, the target data model is published.

In this embodiment, the published target model is separated from original sensor data. Therefore, even if an attacker gets model parameters of the published model, the original sensor data cannot be calculated and protected.

In the embodiments of the present invention, firstly, sensor data is acquired, an initial model is trained using the sensor data, and corresponding intermediate data models are obtained and integrated to form an integrated data model; secondly, new data is processed through the integrated data model and random noise to acquire a label category corresponding to the new data; finally, the integrated data model is trained by using the new data and the corresponding label category, to acquire a data model, so that a plurality of participants may construct a machine learning model without sharing data. In the present invention, a plurality of models is constructed on a plurality of pieces of sensor data, all the models are integrated, and noise perturbations are added, to finally obtain a comprehensive result, so as to achieve better performance than a single sensor model. Noise is introduced into the model, which leads to uncertainty to some extent, so as to fully cover contributions of any individual user and any Internet of Things individual and protect privacy of participants, thereby solving the technical problem of poor data privacy protection of Internet of Things.

It should be understood that the serial number of each step in the above embodiments does not mean the order of execution, and the order of execution of each process should be determined by its function and internal logic, and should not constitute any limitation on the implementation process of the embodiments of the present invention.

Second Embodiment

Based on the same invention concept as the method in the first embodiment, correspondingly, this embodiment further provides a privacy-protection-based data processing model acquisition apparatus.

Figure 4:
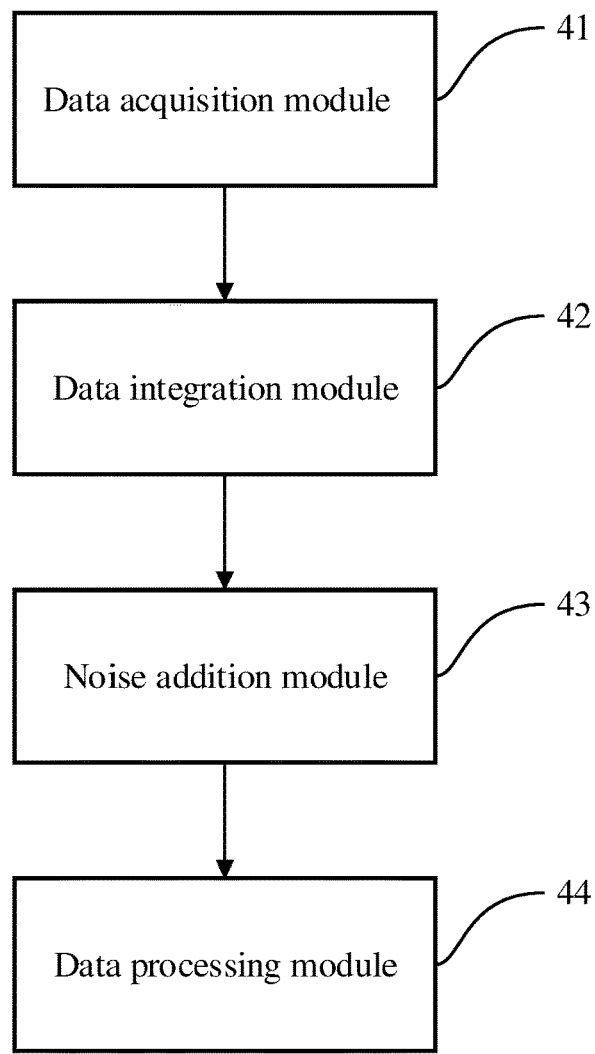
FIG. 4 is a schematic implementation flowchart of a privacy-protection-based data processing model acquisition apparatus according to an embodiment of the present invention.

As shown in FIG. 4, in this embodiment, the privacy-protection-based data processing model acquisition apparatus includes a data acquisition module 41, a data integration module 42, a noise addition module 43 and a data processing module 44.

The data acquisition module 41 is configured to acquire sensor data of a plurality of sensors of a preset Internet of Things device.

The data integration module 42 is configured to train an initial data model corresponding to each of the sensors through the sensor data corresponding to the sensor to obtain an intermediate data model corresponding to each of the sensors, and integrate the intermediate data model corresponding to each of the sensors to form an integrated data model.

The noise addition module 43 is configured to process new data through the integrated data model and random noise to acquire a label category corresponding to the new data.

The data training module 44 is configured to train the integrated data model according to the new data and the label category of the new data to acquire a data model.

In one embodiment, the noise addition module 43 includes: a data acquisition module configured to input the new data to each of the intermediate data models in the integrated data model to acquire a label category outputted by each of the intermediate data models; a first determination module configured to determine a number of initial notes of each of the label categories according to the label category; a noise addition submodule configured to introduce random noise on the basis of the number of initial notes to acquire a number of notes of each of the label categories; and a second determination module configured to determine, according to the number of notes of each of the label categories, the label category whose number of notes meets a preset condition as the label category of the new data.

In one embodiment, the data processing module 44 includes: a data training module configured to train the integrated data model according to a preset rule by using the new data and the label category of the new data; a model acquisition module configured to stop training to obtain a target data model after the preset rule is met; a discarding module configured to discard the sensor data and the integrated data model; and a model publishing model configured to publish the target data model.

In some embodiments, functions of or modules included in the apparatus according to the embodiment of the present disclosure may be configured to perform the method described in the method embodiment above. Specific implementation thereof may be obtained, which is not described in detail here for simplicity.

Third Embodiment

The above methods and apparatuses may be applied to terminal devices such as desktop computers, notebooks, palm computers and cloud servers.

Figure 5:
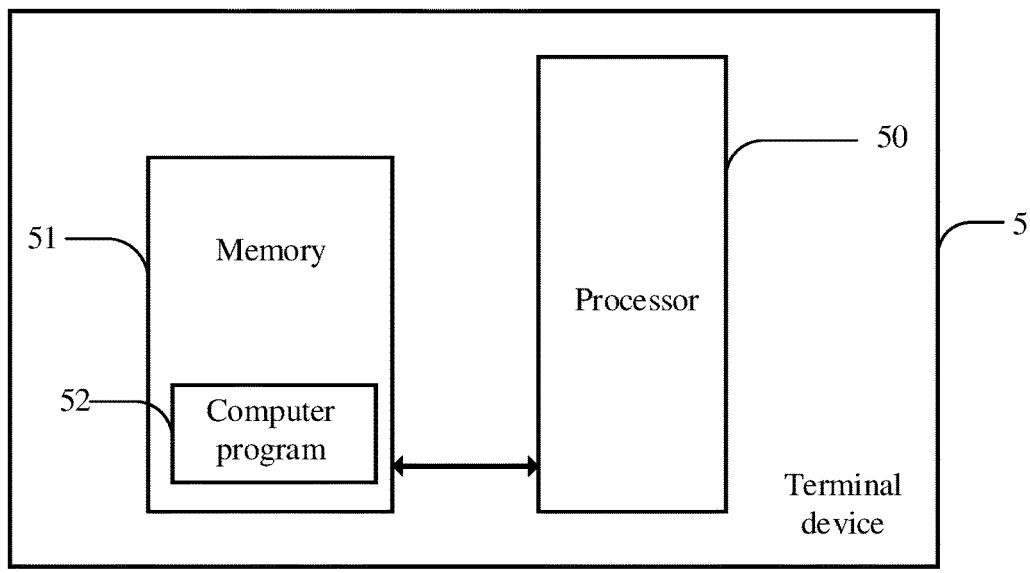
FIG. 5 is a schematic diagram of a terminal device according to an embodiment of the present invention.

FIG. 5 is a schematic diagram of a terminal device according to an embodiment of the present invention. As shown in FIG. 5, the terminal device 5 includes a memory 51, a processor 50 and a computer program 52 stored in the memory 51 and runnable on the processor 50. The processor 50, when executing the computer program 52, performs steps of the privacy-protection-based data processing model acquisition method. For example, FIG. 4 shows functions of modules 41 to 44.

The terminal device 5 may be a computing device such as a desktop computer, a notebook, a palm computer or a cloud server. The terminal device may include, but is not limited to, the processor 50 and the memory 51. Those skilled in the art may understand that a structure shown in FIG. 5 is only an example of the terminal device 5 and does not limit the terminal device 5, which may include more or fewer components than those shown in the drawings, or some components may be combined, or a different component deployment may be used. For example, the terminal device may further include an input/output device, a network access device, a bus and the like.

The processor 50 may be a Central Processing Unit (CPU), or other general-purpose processors, Digital Signal Processors (DSPs), Application Specific Integrated Circuits (ASICs), Field-Programmable Gate Arrays (FPGAs) or other programmable logic devices, discrete gates or transistor logic devices, discrete hardware components, etc. The general-purpose processor may be a microprocessor or the processor may be any general processor or the like.

The memory 51 may be an internal storage unit of the terminal device 5, for example, a hard disk or memory of the terminal device 5. The memory 51 may also be an external storage device of the terminal device 5, such as a plug-in hard disk, a Smart Media Card (SMC), a Secure Digital (SD) Card, a Flash Card or the like configured on the terminal device 5. Further, the memory 51 may also include both the internal storage unit and the external storage device of the terminal device 5. The memory 51 is configured to store the computer program and other programs and data required by the terminal device. The memory 51 may be further configured to temporarily store data that has been or will be outputted.

The integrated module/unit may be stored in a computer-readable storage medium when implemented in the form of the software functional unit and sold or used as a separate product. Based on such an understanding, all or some of the processes implemented in the above embodiments of the present application may also be completed by a computer program to instruct related hardware. The computer program may be stored in a computer-readable storage medium. The steps in the above method embodiments may be implemented when the computer program is executed by a processor. The computer program includes computer program code, which may be in a form of source code, object code, an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include an electrical carrier signal and a telecommunication signal.

Specifically as follows, an embodiment of the present application further provides a computer-readable storage medium. The computer-readable storage medium may be the computer-readable storage medium included in the memory in the above embodiment; or a computer-readable storage medium that exists independently and is not assembled into the terminal device. The computer-readable storage medium stores one or more computer programs.

The computer-readable storage medium stores computer program. When the computer program is executed by a computer, steps of the privacy-protection-based data processing model acquisition method are performed.

It may be clearly understood by those skilled in the art that, for convenient and brief description, division of the above functional modules and modules is used as an example for illustration. In practical application, the above functions can be allocated to different functional units and modules and implemented as required, that is, an internal structure of the apparatus is divided into different functional units or modules to accomplish all or some of the functions described above. The functional units or modules in the embodiments may be integrated into one processing unit, or each of the units may exist alone physically, or two or more units are integrated into one unit, and the integrated unit or module may be implemented in a form of hardware, or may also be implemented in a form of a software functional unit. In addition, specific names of all the functional units or modules are merely for facilitating the differentiation, but are not intended to limit the protection scope of this application. For a specific working process of the units or modules in the above system, reference may be made to the corresponding process in the foregoing method embodiments, which is not described in detail herein.

In the above embodiments, the description of each embodiment has its own emphasis. For a part not described in detail in one embodiment, reference may be made to relevant description of other embodiments.

Those of ordinary skill in the art would appreciate that the units and algorithmic steps of the examples described in combination with the embodiments disclosed herein can be implemented by electronic hardware or a combination of computer software and electronic hardware. Whether these functions are performed by hardware or software depends on a specific application and design constraints of the technical solution. Technical professionals may implement the described functions in different methods for each particular application, but such implementation should not be considered beyond the scope of the present invention.

In the embodiments according to the present invention, it is to be understood that the disclosed apparatus/terminal device and methods can be implemented in other ways. For example, the embodiment of the apparatus/terminal device described above is merely schematic. For example, the division of the modules or units is merely logical function division, and there may be other division manners in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between apparatuses or units may be implemented in an electric form, a mechanical form, or other forms.

The units described as separate parts may or may not be physically separate, and parts displayed as units may or may not be physical units, may be located at one position, or may be distributed on a plurality of network units. Some or all of the units may be selected according to actual needs to achieve the objectives of the solutions of the embodiments.

In addition, the functional units in the embodiments of the present invention may be integrated into one processing unit, or each of the units may exist alone physically, or two or more units are integrated into one unit. The integrated unit may be implemented in a form of hardware or in a form of a software functional unit.

The integrated module/unit may be stored in a computer-readable storage medium when implemented in the form of the software functional unit and sold or used as a separate product. Based on such an understanding, all or some of the processes implemented in the above embodiments of the present invention may also be completed by a computer program to instruct related hardware. The computer program may be stored in a computer-readable storage medium. The steps in the above method embodiments may be implemented when the computer program is executed by a processor. The computer program includes computer program code, which may be in a form of source code, object code, an executable file or in some intermediate forms. The computer-readable medium may include any entity or apparatus capable of carrying the computer program code, a recording medium, a USB flash drive, a removable hard disk, a magnetic disk, an optical disk, a computer memory, a Read-Only Memory (ROM), a Random Access Memory (RAM), an electrical carrier signal, a telecommunication signal, a software distribution medium, and so on. It should be noted that content included in the computer-readable medium may be appropriately increased or decreased according to requirements of legislation and patent practice in a jurisdiction, for example, in some jurisdictions, according to legislation and patent practice, the computer-readable medium does not include an electrical carrier signal and a telecommunication signal.

The above embodiments are merely intended to describe the technical solutions of the present invention, but not to limit the present invention. Although the present invention is described in detail with reference to the foregoing embodiments, those of ordinary skill in the art should understand that they may still make modifications to the technical solutions described in the foregoing embodiments or make equivalent replacements to some technical features thereof. Such modifications or replacements do not cause the essence of the corresponding technical solutions to depart from the spirit and scope of the technical solutions of the embodiments of the present invention, and should be included in the protection scope of the present invention.

What is claimed is:

1. A privacy-protection-based data processing model acquisition method, comprising:
    acquiring sensor data of a plurality of sensors of a preset Internet of Things device;
    training an initial data model corresponding to each of the sensors through the sensor data corresponding to the sensor to obtain an intermediate data model corresponding to each of the sensors, and integrating the intermediate data models corresponding to the sensors to form an integrated data model;
    processing new data through the integrated data model and random noise to acquire a label category corresponding to the new data; and
    training the integrated data model according to the new data and the label category of the new data to acquire a data model,
    wherein, the step of processing new data through the integrated data model and random noise to acquire a label category corresponding to the new data comprises:
    inputting the new data to each of the intermediate data models in the integrated data model to acquire a label category outputted by each of the intermediate data models;
    determining a number of initial notes of each of the label categories according to the label category;
    introducing random noise on the basis of the number of initial notes to acquire a number of notes of each of the label categories; and
    determining, according to the number of notes of each of the label categories, the label category whose number of notes meets a preset condition as the label category of the new data; and
    wherein, the random noise comprises Laplacian noise, the Laplacian noise is Lap(1/ε), ε denotes privacy costs, and a density function thereof is $$f(x, b) = \frac{1}{2b}\exp\left(-\frac{|x|}{b}\right),$$

where x denotes the new data, and b=1/ε.

2. The privacy-protection-based data processing model acquisition method according to claim 1, wherein the plurality of sensors of the preset Internet of Things device are sensors of a same type, and the sensors are one of temperature sensors, smoke sensors, heart rate sensors, distance sensors, photosensitive sensors, acoustic sensors, gas sensors, chemical sensors, pressure sensitive sensors and fluid sensors.

3. The privacy-protection-based data processing model acquisition method according to claim 1, wherein the initial data models of the plurality of sensors are the same;
or the plurality of sensors adopts the initial data models of a same type and different hyperparameters;
or the initial data models of at least two of the plurality of sensors are different.

4. The privacy-protection-based data processing model acquisition method according to claim 1, wherein the initial data model comprises a neural network model, a support vector machine, a logistic regression model or a decision tree model.

5. The privacy-protection-based data processing model acquisition method according to claim 1, wherein a maximum number of notes of the label category is:

$$f(x) = \underset{j}{\operatorname{argmax}}\{n_j(\vec{x}) + Lap(1/\varepsilon)\},$$

where x denotes the new data;
j denotes the label category; and
$n_j(\vec{x})$ denotes the number of initial notes of the label category j to which the new data x belongs.

6. A privacy-protection-based data processing model acquisition apparatus, comprising:
a data acquisition module configured to acquire sensor data of a plurality of sensors of a preset Internet of Things device;
a data integration module configured to train an initial data model corresponding to each of the sensors through the sensor data corresponding to the sensor to obtain an intermediate data model corresponding to each of the sensors, and integrate the intermediate data model corresponding to each of the sensors to form an integrated data model;
a noise addition module configured to process new data through the integrated data model and random noise to acquire a label category corresponding to the new data; and a data training module configured to train the integrated data model according to the new data and the label category of the new data to acquire a data model,
wherein, the processing new data through the integrated data model and random noise to acquire a label category corresponding to the new data comprises:
inputting the new data to each of the intermediate data models in the integrated data model to acquire a label category outputted by each of the intermediate data models;
determining a number of initial notes of each of the label categories according to the label category;
introducing random noise on the basis of the number of initial notes to acquire a number of notes of each of the label categories; and
determining, according to the number of notes of each of the label categories, the label category whose number of notes meets a preset condition as the label category of the new data; and
wherein, the random noise comprises Laplacian noise, the Laplacian noise is Lap(1/ε), ε denotes privacy costs, and a density function thereof is $$f(x, b) = \frac{1}{2b}\exp\left(-\frac{|x|}{b}\right),$$

where x denotes the new data, and b=1/ε.

7. A terminal device, comprising a memory, a processor and a computer program stored in the memory and runnable on the processor, wherein the processor, when executing the computer program, performs steps of the privacy-protection-based data processing model acquisition method according to claim 1.

8. A computer-readable storage medium storing a computer program, wherein, when the computer program is executed by a computer, steps of the privacy-protection-based data processing model acquisition method according to claim 1 are performed.

* * * * *